United States Patent
Prodoehl et al.

(10) Patent No.: US 11,689,504 B2
(45) Date of Patent: Jun. 27, 2023

(54) APPARATUS AND METHOD FOR SECURE COMMUNICATION OVER RESTRICTED NETWORK

(71) Applicant: Connectify, Inc., Philadelphia, PA (US)

(72) Inventors: Brian Prodoehl, Plymouth Meeting, PA (US); Brian Lutz, Philadelphia, PA (US); Kevin Cunningham, Swarthmore, PA (US); Alexander Gizis, Philadelphia, PA (US)

(73) Assignee: CONNECTIFY, INC., Philadelphia, PA (US)

( * ) Notice: Subject to any disclaimer, the term of this patent is extended or adjusted under 35 U.S.C. 154(b) by 0 days.

(21) Appl. No.: 17/848,558

(22) Filed: Jun. 24, 2022

(65) Prior Publication Data
US 2022/0321539 A1 Oct. 6, 2022

Related U.S. Application Data

(63) Continuation of application No. 17/064,846, filed on Oct. 7, 2020, now Pat. No. 11,405,362.

(60) Provisional application No. 62/913,352, filed on Oct. 10, 2019.

(51) Int. Cl.
*H04L 9/40* (2022.01)

(52) U.S. Cl.
CPC ...... *H04L 63/0272* (2013.01); *H04L 63/0428* (2013.01); *H04L 63/08* (2013.01)

(58) Field of Classification Search
CPC .. H04L 63/0272; H04L 63/0428; H04L 63/08
See application file for complete search history.

(56) References Cited

U.S. PATENT DOCUMENTS

| 2018/0324144 A1* | 11/2018 | Shi ...................... H04L 12/4641 |
| 2019/0097976 A1* | 3/2019 | Elsins .................. H04W 76/10 |
| 2020/0358770 A1* | 11/2020 | Parla ..................... H04L 63/029 |
| 2020/0382401 A1* | 12/2020 | Rudnik .................. H04L 43/12 |
| 2021/0112035 A1* | 4/2021 | Prodoehl ............. H04L 63/0428 |

* cited by examiner

*Primary Examiner* — Chau Le

(57) ABSTRACT

Data networking may include forwarding, via a client device, data across a first communication network to a virtual private network (VPN) server, wherein the data is destined for a remote server, forwarding a request sent outside the VPN server, via the client device, to access a second communication network detected by the client device, receiving, via the client device, a captive portal requiring authentication information, forwarding, via the client device, the authentication information to an authentication server to obtain access to the second communication network, wherein the authentication information is not forwarded to the VPN server, and forwarding and receiving additional data, via the client device, to the VPN server concurrently across the first communication network and the second communication network.

20 Claims, 5 Drawing Sheets

APPARATUS AND METHOD FOR SECURE COMMUNICATION OVER RESTRICTED NETWORK

CROSS REFERENCE TO RELATED APPLICATION

This application is a continuation of U.S. patent application Ser. No. 17/064,846 entitled, "APPARATUS AND METHOD FOR SECURE COMMUNICATION OVER RESTRICTED NETWORK," filed on Oct. 7, 2020, which claims the benefit of U.S. provisional patent application No. 62/913,352 entitled, "APPARATUS AND METHOD FOR SECURE COMMUNICATION OVER RESTRICTED NETWORK," filed on Oct. 10, 2019, the entire contents of which are hereby incorporated by reference.

BACKGROUND

While connected to a secure computing environment, users are typically protected from unauthorized receipt of their communication. Furthermore, chances of eavesdropping, destruction, or other adverse actions may be prevented by minimizing the chance of infection via spyware or malware. Technology users thus prefer to perform computer interaction on an enterprise network (or a trusted network) to ensure computer security.

It is not possible, however, to always confine oneself to a secure environment. Users are often in places where they require Internet access, but access is only available via a public network that is not secure. More specifically, users may need to connect a laptop and/or mobile phone to the Internet, may require various levels of security in their computation and communication tasks, and may find that the only practical way to communicate with the Internet is via a publicly available server. Connecting to the Internet in such an environment exposes the user to eavesdropping, data destruction, hacking etc. Another danger, however, also exists. When users are on their secure networks, firewall and security software often protects them from being able to communicate with sites that can potentially cause harm. Outside of the secure network, there might not be a "gatekeeper" to prevent a user from engaging in harmful site access. Furthermore, a user may access an endpoint with malware present, and such malware can subsequently gain access to enterprise resources.

Access to unsecured networks is often simple to achieve, since such networks are typically wireless. It is very common for such a network to be a local area network (LAN), and access to the LAN is provided via a wireless standard such as Wi-Fi. An access point provides a physical interface at which a user gains access to the LAN. The LAN may then transmit data to and receive data from a wide area network (WAN) such as the Internet.

Because wireless access has become so simple for the average layperson to achieve, wireless communication techniques are commonly used with a wide variety of mobile terminals, including smartphones, electronic whiteboards, projectors, laptops, etc. Wireless communication is performed by gaining entrance to a network using an access point. Because it is often not possible to visually confirm who is gaining access to wireless network, security relating to wireless communication typically needs to be more enhanced than in wired communication. Thus, before the terminal is connected to a wireless access point, the terminal may first be authenticated. Furthermore, in many wireless applications, data that is transmitted and received is encrypted. Another way to protect the wireless network is to limit access to terminals that have MAC addresses that are registered in advance. When the terminal attempts to connect to an access point, the MAC address of the terminal is compared to a list of MAC addresses. Connection is only permitted if the terminal's MAC address is on the list.

While the use of MAC addresses as a security tool works well, such a strategy also creates substantial limitations. In particular, a user with a legitimate right to be on a private network may be denied access because the MAC address of the user's terminal has not been preregistered. As another example, a guest having a smart phone, laptop, or tablet may be invited into a conference room to exchange information or have a discussion using the guest's electronic device. If the MAC address of the device has not been preregistered, use of the device on the private network is not permitted.

As a further example, a substantial number of businesses operate private networks in their respective physical locations. Such offerings have numerous advantages. For example, many buildings are constructed of materials that interfere with the cellular communication of a user that is inside the building. An individual shopping in a retail store may thus be unable to communicate with their cellular network. A business may wish to offer their own private wireless network to all shoppers as part of providing good customer service. If a shopper has good wireless communication during their shopping experience, the shopper is incentivized to stay in the store for a longer period of time, and to make additional purchases. As another example, current Wi-Fi technology allows a shopper on a Wi-Fi network to be position tracked as they move about the store. In this manner, it is possible to obtain intelligence regarding shopper behavior.

Providing the public with access to a private network, while advantageous, is not without its risks. For example, the owner of a private network typically does not wish to give every member of the public unrestricted access to their network. At a minimum, it may be desirable to insist that each network user agree on terms or conditions for network access in order to limit liability. Also, it may be very desirable to advise potential network users of rules they are required to follow while using the network in order to maintain network integrity. In other situations, prior to granting network access, it may be desirable to obtain some form of identification and/or password so that the network owner has information regarding who is on their network. In other situations, network owners may desire greater quantities of information to ensure security and/or enable future advertising or marketing to network users. In a further situation, network owners may wish to limit network access to individuals that are actually making purchases within their establishment (by providing them a password, for example, after making a purchase). In yet further situations, network owners may desire to be paid for network access before network access is granted.

One way to achieve the above goals is by providing limited accessibility to a network. Such a network may be referred to as "closed." The limited accessibility allows a user terminal to request authentication from the network. Once authentication has been completed, the user terminal is then permitted greater (or possibly total) access to the network.

One common way to provide authentication to a user terminal seeking network access is via a captive portal. Wikipedia defines a captive portal as follows: . . . a web page accessed with a web browser that is displayed to newly connected users of a Wi-Fi network before they are granted broader access to network resources. Captive portals are commonly used to present a landing or login page which may require authentication, payment, acceptance of an end-user license agreement, acceptable use policy, survey completion, or other valid credentials that both the host and user agree to adhere by. Captive portals are used for a broad range of mobile and pedestrian broadband services—including cable and commercially provided Wi-Fi and home hotspots. A captive portal can also be used to provide access to enterprise or residential wired networks, such as apartment houses, hotel rooms, and business centers.

Network resources are thus withheld from a user terminal requesting network access until the requirements of the captive portal have been satisfied. The captive portal may be transmitted to a prospective network user in response to a request for network access. An example of a request for network access is an HTTP request for a web page from a requesting terminal. A captive portal authentication server evaluates the request for network resources and determines if the request has come from a source that has already been granted (full) network access. If not, the authentication server responds to the HTTP request with either the contents of the captive portal page, or an HTTP Redirect response which sends the HTTP client to the URL of the captive portal page where it is hosted. Once required information has been provided to the authentication server in response to the captive portal, widespread network access is then granted to the requesting terminal.

The network for which access is granted by the captive portal may be referred to as a closed network, an initially closed network, or a captive network.

Captive portals control network access. They do not, however, address the issue of secure communication. In fact, once access to a network guarded by a captive portal is granted, a user is often communicating in a non-secure environment, and risk of security breach may be high.

Generally speaking, one method of allowing users to have secure communication over a network is through the use of a secure communications channel. An example of a secure communications channel is a Virtual Private Network (VPN). Various types of VPNs are available. A corporate VPN enables access to the internal resources (intranet) of an enterprise. A private VPN permits access to Internet resources. When data is sent over a public network using a VPN, eavesdropping of the data is prevented.

In order to communicate over the Internet, data segments from layer-4 in the OSI model (Transport) are divided into packets. An IP packet is then formed by adding header information to the data unit received from layer-4. The resulting IP packet comprises an IP header and an IP payload (where the data is located). In the header, address information is included such as the source of the data and the destination of the data. The source of the data is included in the header so that once the packet is received at its destination, a response can be transmitted to the data source. The IP packets form IP traffic (also known as layer-3 traffic). The communications format may also be referred to as TCP/IP.

In order to exchange data over a VPN, the IP traffic is received by the VPN software (i.e. the VPN client). The VPN software a) optionally encrypts each IP packet b) encapsulates each IP packet with a new header. Again, step a) is optional and step b) is not optional. The new header includes the VPN server as the destination address and the client as the source address. Once the encapsulated IP traffic is received by the VPN server, the new header is removed, encrypted data (if any) is decrypted, and the IP packet is delivered to its intended destination.

When referring to a VPN, application data and its associated header (for example an IP packet) is considered to be "encapsulated" when a further header that includes the destination address of a VPN server is attached to the application data (and associated header). When referring to the transmission of application data (and its associated header) outside of a VPN, application data is considered to be "unencapsulated" when it is not encapsulated (i.e. a header that includes the destination address of a VPN server is not attached to the application data and its associated header) and "decapsulated" when encapsulation is removed. Put another way, unencapsulated application data (and its associated header), for example an IP packet, is 1) encapsulated by a VPN client, 2) the encapsulated application data and header is transmitted to a VPN server, 3) the VPN server decapsulates the encapsulated application data, and 4) the decapsulated application data is forwarded to a final destination.

In the above example the encapsulated data may or may not be encrypted.

SUMMARY

A method of communicating with a remote server via a client, the method comprises the steps of: allowing encapsulated data to be transmitted from the client and towards a remote server via a VPN; attempting to gain access to, or to increase access to, a private network with unencapsulated data and outside of the VPN; identifying a captive portal that restricts access to the private network; allowing receipt of signaling with unencapsulated data outside of the VPN that causes an authentication server associated with the captive portal to permit access or increase access to the private network; and transmitting encapsulated data from the client to the remote server via the VPN and over the private network after the authentication server grants access to the private network.

One example embodiment may include a method of operation which may include forwarding, via a client device, data across a first communication network to a virtual private network (VPN) server, wherein the data is destined for a remote server, forwarding a request sent outside the VPN server, via the client device, to access a second communication network detected by the client device, receiving, via the client device, a captive portal requiring authentication information, forwarding, via the client device, the authentication information to an authentication server to obtain access to the second communication network, wherein the authentication information is not forwarded to the VPN server, and forwarding and receiving additional data, via the client device, to the VPN server concurrently across the first communication network and the second communication network.

Another example embodiment may include a client device with a processor configured to forward data across a first communication network to a virtual private network (VPN) server, wherein the data is destined for a remote server, forward a request sent outside the VPN server to access a second communication network detected by the client device, receive a captive portal requiring authentication information, forward the authentication information to an authentication server to obtain access to the second communication network, wherein the authentication information is not forwarded to the VPN server, and forward and receive additional data to the VPN server concurrently across the first communication network and the second communication network.

Another example embodiment may include a non-transitory computer readable storage medium configured to store instructions that when executed cause a processor to perform forwarding, via a client device, data across a first communication network to a virtual private network (VPN) server, wherein the data is destined for a remote server, forwarding a request sent outside the VPN server, via the client device, to access a second communication network detected by the client device, receiving, via the client device, a captive portal requiring authentication information, forwarding, via the client device, the authentication information to an authentication server to obtain access to the second communication network, wherein the authentication information is not forwarded to the VPN server, and forwarding and receiving additional data, via the client device, to the VPN server concurrently across the first communication network and the second communication network.

DETAILED DESCRIPTION

Today it is well-known that substantial amounts of communication take place over the Internet. Such communication can include (for example) voice communication, video transmission, and written correspondence (e.g., email, chat, instant messaging, Tweets, etc.). The use of electronic devices has become so prevalent that today almost all adults in the United States own some sort of mobile phone. In addition to a mobile phone, some users may carry a further device such as a laptop or tablet.

To meet increasing demand for Internet access, public access to the Internet is widely available. Facilities such as shopping centers, malls, stores, restaurants, office buildings, and public transportation may offer open connections to the Internet. These connections may often be available without paying a fee.

While it is beneficial for users to have widespread access the Internet, there are also challenges because such connections may be unsecure. For example, a user communicating via an unsecured Internet connection may transmit signal packets that are easily intercepted and/or viewed by others. Transmission of passwords, credit cards, and other sensitive information may thus be readily viewed by unintended parties.

Figure 1:
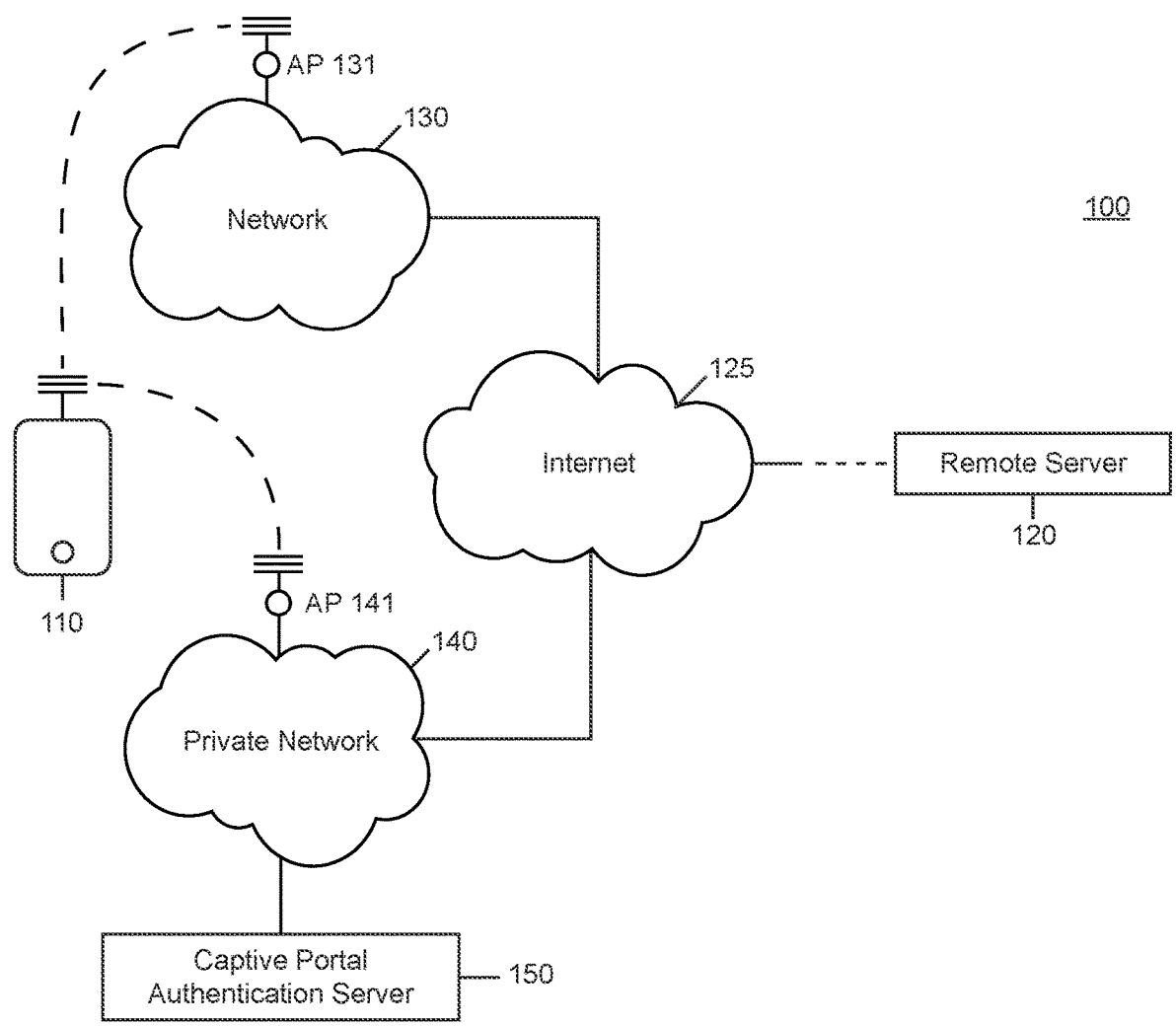
FIG. 1 is a block diagram that illustrates communication with a remote server via a captive portal.

FIG. 1 illustrates a user communicating with a network via a mechanism called a captive portal. Initially, system 100 illustrates that client 110 wishes to communicate with remote server 120. As shown, client 110 may be, for example, a mobile communications device that wirelessly communicates with network 130 via respective access point (AP) 131. Network 130 may be any type of network including a public network or a private network. As an example, network 130 may be a cellular communications network that is maintained by a cellular communications provider (such as Verizon, AT&T, Sprint, etc.). Network 130 is shown coupled to Internet 125 and communicating with Internet 125 through communication protocols that are well known to one of ordinary skill in the art. In one example, network 130 interfaces with Internet 125 via a fiber optic or Ethernet Internet connection.

While in one example network 130 is a public network, the term public network refers to a (publicly available) network of devices that is not limited to particular devices, and that are able to communicate with other devices on the network. Thus, in one example, network 130 is accessed without a password. Alternatively, network 130 may be a private network and any device communicating therewith must be authenticated before communication with network 130 is permitted. Furthermore, while one access point is shown in FIG. 1, it is understood that typically (but not always) multiple access points may be used to gain access to network 130. For example, if network 130 is a cellular network, access points may be located in numerous geographic locations. Alternatively, if network 130 is a LAN, the access point may be a wireless router. Network 130 may thus be a LAN such as a wireless home network, a combination of wired and/or wireless connections, and perhaps one or more intervening networks (such as a wide area network) so that access to Internet 125 may be obtained.

In the example above, a user may use client 110 for voice communication. Assume client 110 is a cell phone, such as a smart phone, that is capable of communication via a Voice over IP (VoIP) application. Client 110 communicates wirelessly with network 130 via respective access point 131 and a digitized form of the user's voice is then transmitted to Internet 125. From Internet 125, the data that represents the user's voice is transmitted to remote server 120. From remote server 120, the data may be transmitted to another user (not shown) so that voice communication between the two users may occur.

In another embodiment, client 110 streams video from remote server 120. Client 110 requests the video data from remote server 110 by transmitting a request through network 130 and Internet 125. Remote server 120 responds to the request by transmitting video via Internet 125, and back to network 130, so that it is eventually received by client 110.

In the example shown in FIG. 1, although client 110 is communicating via network 130, client 110 now wishes to communicate via private network 140. In one example, there may be a communication "hand-off" from network 130 to private network 140. If, however, network 140 has restricted access, such as the restriction that exists when a captive portal is in use, a "hand-off" to private network 140 may not be possible. For example, if client 110 starts to transmit data to network 140, but access to network 140 is restricted, then network 140 may refuse to receive (and/or carry) the data transmitted by client 110. Such data may be prohibited from reaching its intended destination. As a result, when data transmission (e.g. voice communication, streaming, etc.) initially occurs via network 130, and attempt is made to transition the data transmission to network 140, the data transmission may be interrupted and/or data may be irretrievably lost.

In another example, while communication initially occurs solely via network 130, communication subsequently may be desired via network 130 and private network 140 simultaneously. Such simultaneous communication may be desirable, for example, in a multipath environment ("bonded" or a "bonded connection") that exists so that there is greater bandwidth than what is obtained in single path environment. An example of a multipath communications environment is provided, for example, by the product Speedify (manufactured by Connectify, Philadelphia, Pa.). Other multipath communication systems are well known to one of ordinary skill in the art. See for example Hoekstra, US 2007/0115987 which is incorporated herein by reference.

In yet another example, communication switches from occurring over network 130 to occurring over network 140, but for some period of time, communication over network 130 and network 140 is concurrent.

While client 110 is communicating with network 130, the individual that is using client 110 enters a physical area where access to private network 140 is desired. An example of private network 140 may be, for example, a LAN that is accessed via a communication protocol such as Wi-Fi. In one example, client 110 begins to receive a strong signal from access point 141 that potentially allows access to private network 140, while a signal for obtaining access to network 130 becomes either weak or unavailable. In such an example, it is desired to "hand-off" communication from network 130 to private network 140. In another example, while communication initially occurs with a strong signal for accessing network 130, at a subsequent time strong signals exist for communication with network 130 and private network 140 concurrently. With such concurrent strong signals, concurrent access (bonding) to network 130 and network 140 may be desirable.

Before client 110 is provided access to private network 140, client 110 is desirably authenticated. Initially, client 110 is prohibited (or limited) from communicating with Internet 125 via private network 140. As an initial step, client 110 attempts to communicate with (or polls) private network 140. Such polling may be, for example, by making an HTTP request. This HTTP request is initially routed to captive portal authentication server 150.

Alternatively, such polling may be in the form of unencrypted data. Alternatively, such polling may be in a form that is recognized by captive portal authentication server 150 (as opposed to, for example, encrypted data that server 250 is unable to recognize).

Client 110 subsequently evaluates the response received from private network 140 to determine whether a captive portal is in place. For example, client 110 can transmit to private network 140 the URL of a website with a known response. As an example, if client 110 sends to the Internet an HTTP request to the host "www.msftncsi.com" and a path of "/ncsi.txt"http://www.msftncsi.com/ncsi.txt, the expected response is the text string "Microsoft NCSI". If client 110 does not receive the expected response (to the HTTP request, for example), then client 110 concludes that private network 140 is a captive network that is protected by a captive portal.

When a captive portal is detected, authentication with the captive portal may occur. How authentication will actually occur with a specific captive portal will depend upon the requirements of the captive portal. For example, one captive portal may simply require agreement to terms of use. Another captive portal may require providing identification information and/or an email address. In other scenarios, the captive portal may require a credit card (so that the credit card can be charged) in order to obtain access to the Internet via a captive network. Typically, captive portal authentication server 150 transmits to client 110 an authentication web page (or redirects client 110 to an authentication web page) so that client 110 can provide server 150 with whatever information is required to give client 110 full (or greater) access to network 140. In other words, server 150 takes an action that causes client 110 to receive an authentication web page. The authentication web page specifically requests from client 110 required information to grant full (or greater) access to network 140 (name, email address, credit card, acknowledgement of terms, etc.).

Captive portal authentication server 150 receives one (or more) responses to its action, of providing an authentication page, from client 110. If captive portal authentication server 150 receives the required response(s), then captive portal authentication server 150 records/stores sufficient information so that client 110 has full (or greater) access to network 140. "Sufficient information" may include the MAC address of client 110 (for example). In one example, during future attempts of client 110 to communicate with Internet 125, the MAC address recorded by authentication server 150 is compared with the MAC address of client 110, and if the two match, then full access to network 140 (and thus Internet 125) is granted. In one exemplary embodiment, full (or greater) access to network 140 is granted until such access expires (i.e. an expiration date has been reached, a predetermined amount of data has been exceeded, a credit card has expired, etc.). While access to network 140 is granted, client 110 may not be redirected to captive portal authentication server 150 when client 110 initiates communication with private network 140. Once access expires, client 110 upon initiating communication with private network 140 is again redirected to captive portal authentication server 150 until access to private network 140 has again been granted.

In any event, once captive portal authentication is complete, client 110 is permitted to communicate with remote server 120 via private network 140 and Internet 125. As previously explained, communication with remote server 120 via private network 140 and network 130 can be concurrent, or can occur in a serial manner. In other words, once authentication is complete, both private network 140 and network 130 may transfer data between client 110 and server 120. Alternatively, network 130 may transfer data between client 110 and server 120, and then network 140 may transfer data between client 110 and server 120. In addition, during the "hand-off" from network 130 to network 140, there may be overlap, i.e. concurrent data transfer by network 130 and network 140 (before data transfer by network 130 ceases and data transfer by network 140 continues). In this manner, loss of data during the "hand-off" may be prevented.

Generally speaking, the use of captive portals is well known in the art. However, difficulties may arise when using a captive portal in combination with a secure communications channel such as a VPN. Simply put, as explained above, when communication occurs via a VPN, the data is encrypted. Thus, if communication via VPN is occurring via network 130, and communication suddenly switches to private network 140, VPN data will be transmitted to private network 140 despite the fact that the source of the VPN data, client 110, has not be authenticated. In other words, VPN data will be transmitted to private network 140, a captive network, even though the requirements of the captive portal (that prevents access to private network 140) have not been satisfied. Without performing authentication of client 110 via captive portal authentication server 150, VPN data transmitted by client 110 will be denied access to private network 140, and VPN data intended to be transmitted over network 140 will be prevented from reaching Internet 125. To the extent the VPN relies on network 140 to communicate over Internet 125, that communication will fail.

VPNs are typically used in various situations, including: Normal VPNs use only one Internet connection at a time; and Multipath VPNs use multiple Internet connections concurrently if they are available.

If a regular single socket VPN simply attempts to send encrypted data to a captive portal (without client authentication) via a single Internet connection, connection is typically not possible If a single socket VPN has multiple Internet connections available, one of which has a captive portal, connection of the VPN on the captive network may fail, or the VPN may be active on networks other than the captive network (the network associated with the captive portal). Access to the captive network by the VPN may then be difficult if not impossible, as the server associated with the captive portal will receive encapsulated data, and when the server's requirements for granting access to the captive network are not met (because it cannot process the encapsulated data), it will refuse to permit the VPN to communicate over the captive network. The access point associated with the captive network will then simply be a non-working hotspot.

Figure 2:
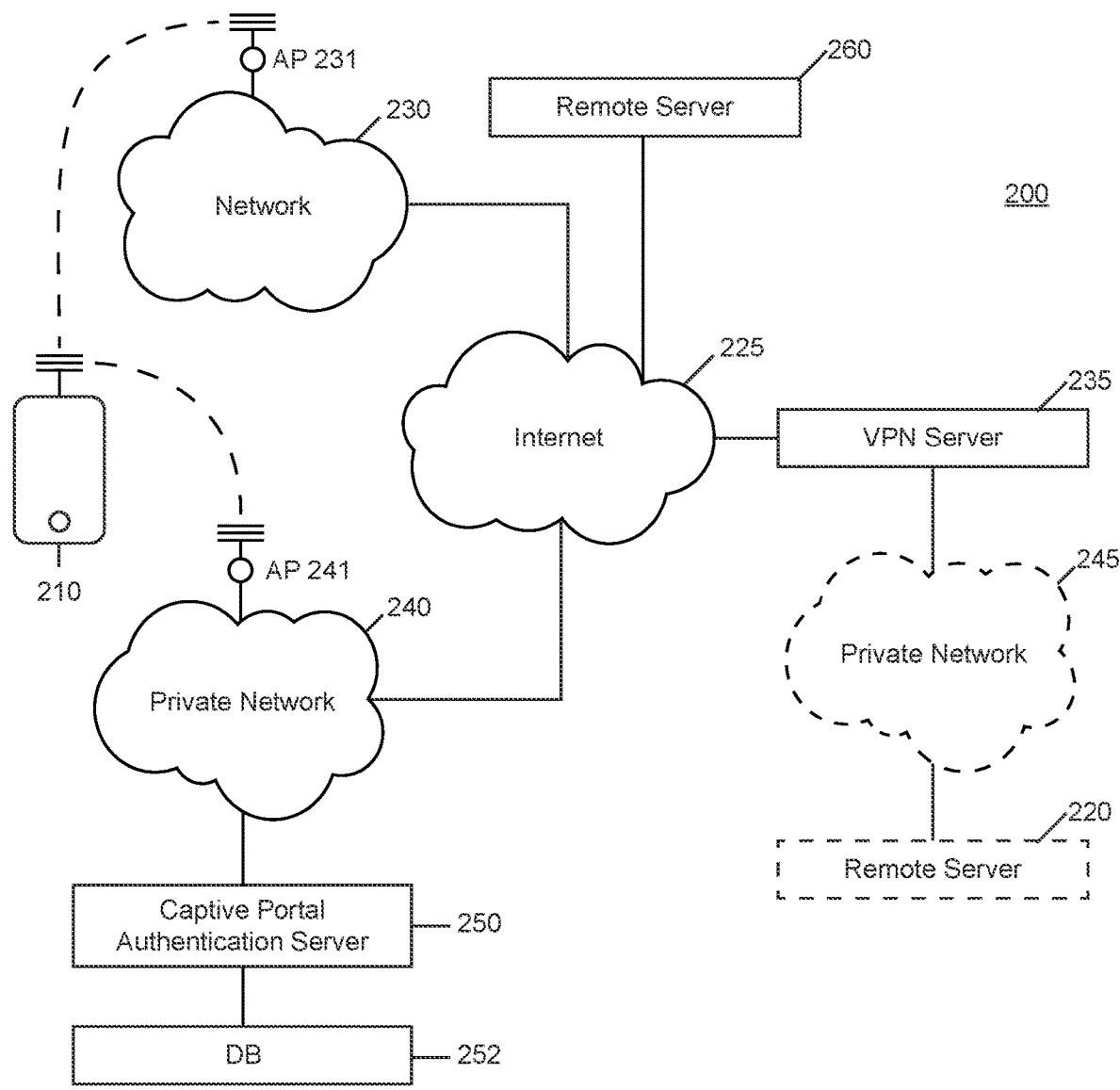
FIG. 2 is a block diagram that illustrates communication via a secure channel (such as a VPN) and over a captive network in accordance with an exemplary embodiment of the present invention.

In an exemplary embodiment of the present invention, when data is being transmitted to a remote server via a VPN (prior to communicating via a captive network), operation of an exemplary embodiment of the present invention may be achieved as illustrated, for example, by FIG. 2.

In FIG. 2, VPN communication (as an example of secured and/or encapsulated communication) initially occurs between client 210 and VPN server 235. Client 210 may be a mobile communications device. Client 210 may be a secured client such as a VPN client. As shown, VPN communication occurs through network 230 via its respective access point 231, through Internet 225, and to VPN server 235. Client 210 and VPN server 235 each include respective VPN clients for encrypting and decrypting (and/or encapsulating and decapsulating) data transmitted between them. After encrypted/encapsulated data is received by VPN server 235, the data is decrypted/decapsulated and delivered to one or more of various servers depending upon the exemplary embodiment. In one exemplary embodiment, the decrypted/decapsulated data is delivered to remote server 220 via private network 245. In another exemplary embodiment, the decrypted/decapsulated data is transmitted to remote server 260 via Internet 225.

If the data is transmitted to remote server 220, then when remote server 220 responds, remote server 220 provides data (e.g. streaming video) to VPN server 235 via private network 245. The data is encrypted/encapsulated by VPN server 235 and is subsequently transmitted to client 210 via Internet 225 and network 230.

If the data is transmitted to remote server 260, then when remote server 260 responds, remote server 260 provides data (e.g. streaming video) to VPN server 235 via Internet 225. The data is encrypted/encapsulated by VPN server 235 and is subsequently transmitted to client 210 via Internet 225.

It is noted that: remote server 220 may be optional when remote server 260 is available, remote server 260 may be optional when remote server 220 is available, or remote server 220 and remote server 260 may both be present and available.

At some point, client 210 (e.g. a secured client) is in range of access point 241 (and thus private network 240). For example, client 210 eventually receives a sufficiently strong signal from access point 241 for communication therewith. This may occur, for example, when a user that is physically carrying client 210 enters a building in which Wi-Fi access to the Internet is (conditionally) offered to the public. As a result, access to private network 240 is desired via access point 241. Access to private network 240 may be in place of or in addition to access with network 230. Client 210 signals (or transmits data to) private network 240 (to communicate therewith) via access point 241, but client 210 is prohibited (or limited) from accessing Internet 225 because access to network 240 is controlled by a captive portal.

While client 210 is attempting to gain access (or full access) to Internet 225 via private network 240, client 210 continues to have VPN communication with VPN server 235 via access point 231. As captive portal authentication server 250 is authenticating client 210 (or at least attempting authentication), client 210 and VPN server 235 continue to exchange encrypted/encapsulated data via network 230 and Internet 225. As VPN server 235 is receiving encrypted/encapsulated data from client 210, VPN server 235 is decrypting/decapsulating that data and either (or both) transmitting that data via private network 245 to remote server 220 or transmitting that data via Internet 225 to remote server 260. Similarly, while captive portal authentication server 250 is attempting to authenticate client 210, remote server 220 may transmit data back to VPN server 235 via private network 245 or remote server 260 may transmit data back to VPN server via Internet 225. The data received by server 235 from server 220 and/or server 260 is encrypted/encapsulated and transmitted to client 210 via Internet 225 and network 230.

Captive portal authentication server 250 thus receives a signal from client 210 (via network 240) indicating that client 210 desires to (more) fully access network 240 (and to thereby access Internet 225). The signal that server 250 receives from client 210 may be, for example, an HTTP request to receive a website page with known text. The URL described above (with reference to FIG. 1) that responds with the text "Microsoft NCSI" is an example of an HTTP request that when properly processed by the Internet provides a known response. If private network 240 does not return to client 210 an expected response (for example to an HTTP request), client 210 now knows that private network 240 is protected by a captive portal (because instead of receiving the expected response, client 210 was blocked from receiving the expected response via the captive portal).

In response to client 210 signaling private network 240, captive portal authentication server 250 attempts to authenticate client 210. This may be accomplished, as explained above, by providing a login screen, requesting agreement to the terms of use, providing a credit card, etc. Client 210 then has an opportunity to provide captive portal authentication server 250 with the required response. The authentication process thus comprises the following exemplary steps:

Client 210 transmits a signal (e.g. HTTP request) to private network 240 to determine whether private network 240 is guarded by a captive portal;

Captive portal authentication server 250 responds to client 210's signal by transmitting to client 210 that there is a need for captive portal authentication, or by redirecting the request to the captive portal;

When client 210 does not receive an expected response to its signal (that was transmitted in step 1), client 210 now knows that network 240 is guarded by a captive portal;

Client 210 provides server 250 with the authentication information that server 250 requires (if it can).

Server 250 checks the information provided by client 210 to confirm that all required information has been provided.

Server 250 grants permission to client 210 to (more) fully access network 240 (for example by retaining the MAC address of client 210).

Client 210 (more) fully accesses network 240 (and thus accesses Internet 225 via network 240), and does not require authentication from authentication server 250 during future transmissions from client 210 in order to access Internet 225 via private network 240.

In a further exemplary embodiment of the present invention, an alternative process of finding the captive portal in step 1 may be used. For example, in RFC 7710—"Captive-Portal Identification Using DHCP or Router Advertisements (RAs)" (incorporated by reference in its entirety), clients are able to find if a network has a captive portal, and what URL to call to connect to it, via checking a DHCP option on an IPv4 network, or via Router Advertisement on an IPv6 network.

While authentication to (more) fully access private network 240 is occurring, VPN communication between client 210 and VPN server 235 is occurring via network 230. While logging into the captive portal, the VPN is still able to keep other traffic flowing, encapsulated and encrypted on other connections so traffic (calls, downloads, etc.) are not interrupted.

Client 210 may thus respond to the server 250 in a manner that causes server 250 to grant (more) access to private network 240. After client 210 returns the response required by authentication server 250 (i.e. step 4 above), authentication server 250 may record identification information associated with client 210 so that, during a subsequent time that client 210 desires access to private network 240, that access can be provided based upon the fact that client 210 has already been identified. One manner of identifying client 210 for future recognition (and permission) is by storing the MAC address associated with client 210 in database 252. Other identification information can also be stored in database 252 including, for example, a username, a password, a credit card number, etc. Database 252 can then be examined when client 210 is trying to access private network 240, and access to private network 240 can be granted if the MAC address of client 210 is stored in database 252.

Once client 210 has been authenticated, captive portal authentication server 250 allows client 210 to communicate with Internet 225 via private network 240. Client 210 is thus able to transmit encrypted data to VPN server 235 via private network 240 and Internet 225, for a) subsequent receipt by private network 245 and remote server 220; or b) subsequent receipt by remote server 260 via Internet 260. Any response (e.g. streaming of data) from remote server 220 may likewise be channeled over private network 245, VPN server 235, Internet 225 and private network 240 before reaching client 210. Any response from remote server 260 may likewise be channeled over Internet 225, VPN server 235, Internet 225 and private network 240 before reaching client 210.

In one exemplary embodiment, a VPN channel initially exists only via network 230. After client 210 has been authenticated by captive portal authentication server 250, the VPN channel is discontinued over network 230, and the VPN channel is active over private network 240 (in order for the VPN channel to be connected with VPN server 235). In another embodiment, a VPN channel (or VPN channels) is simultaneously active over network 230 and private network 240. As a result of having a VPN channel (or multiple VPN channels) that is active over two (or more) networks, more bandwidth is available than over either network alone. In yet a further embodiment, the VPN channel is initially established (and is active) over network 230, is then established (or another channel is established) over private network 240 (so that the VPN channel is active concurrently over network 230 and private network 240), and a VPN channel is subsequently active only over private network 240 (the channel over network 230 is discontinued). In this manner, there is overlap in the "handoff" between the two networks to ensure that no data is lost in the transition between the two networks.

In the above manner, while encrypted data is being transmitted to server 235 via network 230, one or more of the following steps are occurring: transmitting a signal to network 240 in order to gain access (or expecting that access is available, whether or not it is), identifying a captive portal, and responding to the captive portal to gain (more) access to network 240.

Figure 3:
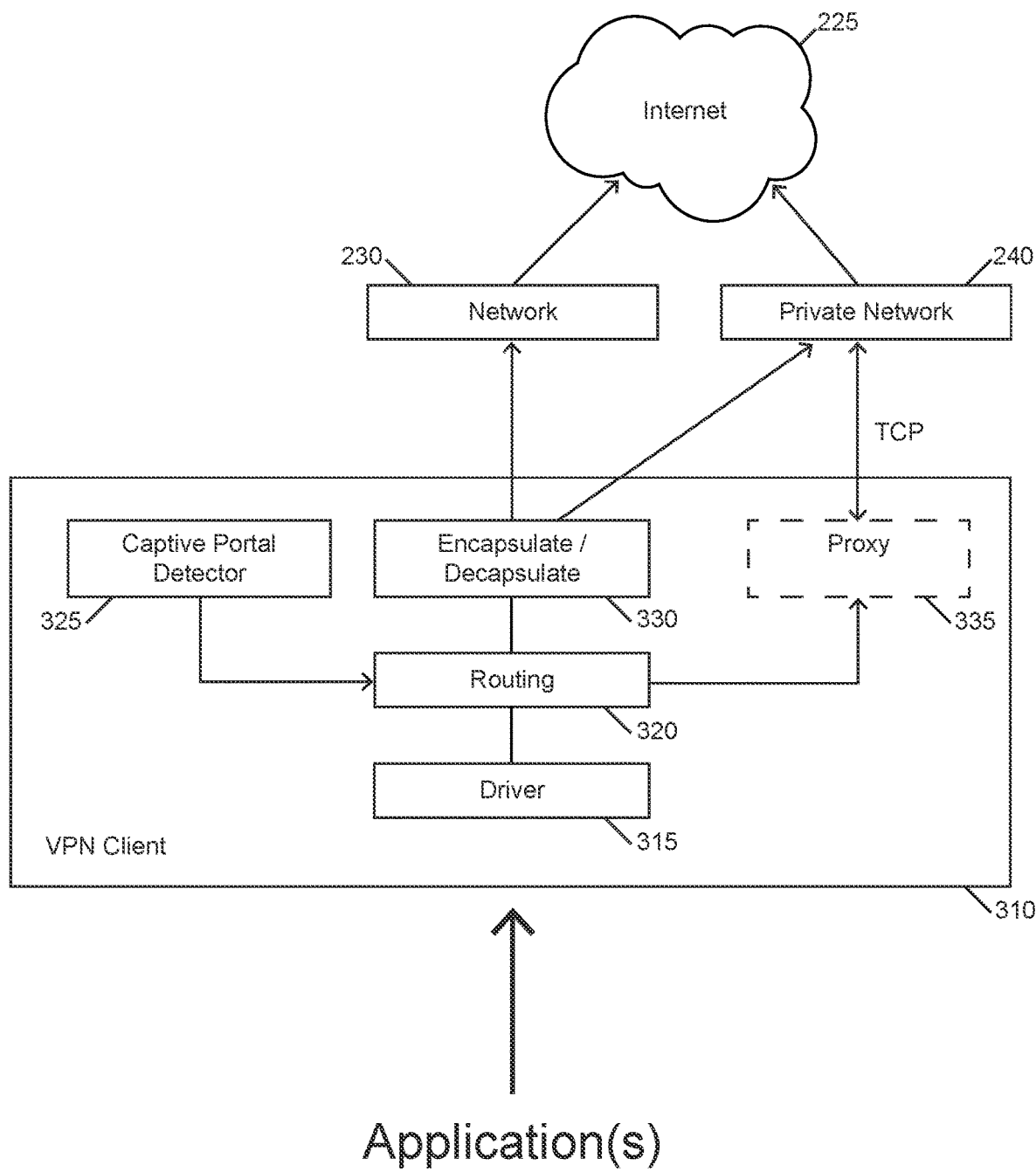
FIG. 3 is a block diagram that further illustrates communication in accordance with FIG. 2, and that also illustrates operation of a VPN client, in accordance with an exemplary embodiment of the present invention.

Communication between client 210 and VPN server 235 via private network 240 is further explained with reference to FIG. 3. In particular, FIG. 3 illustrates a VPN client 310 that may be resident, for example, within client 210.

VPN client 310 includes driver 315 that receives data from one or more applications, inserts the data into a VPN channel, and then forwards the data over the VPN channel to Internet 225 (and subsequently to VPN server 235). Driver 315 may be, for example, a TUN/TAP driver.

Data transmitted from driver 315 is received by routing module 320. The purpose of routing module 320 is to determine whether the received data will be further encapsulated (for purposes of being transmitted via a VPN) and to which network the data will be transmitted. Thus, initially, during VPN communication, data is forwarded to encapsulation module 330 and subsequently transmitted to network 230. From there, the data is transmitted via VPN to Internet 225 and subsequently to VPN server 235.

At some point, access point 241 is detected and client 210 desires to communicate over network 240 (so that communication with VPN server 235 occurs over network 240). Therefore, captive portal detector 325 will determine via routing module 320 whether private network 240 is a captive portal. In some embodiments, captive portal detector 325 will cause routing module 320 to launch proxy 335 in order to communicate with private network 240. Proxy 335 may allow a web browser to be opened for login to a captive portal, and may be situated in the VPN client. It is understood to one of ordinary skill in the art that some operating systems (iOS) rely on the use of a proxy to communicate with private network 240, while other operating systems (i.e. Windows) do not normally need a proxy. Whether or not proxy 335 is needed, VPN client 310 communicates with private network 240 (through optional proxy 335) to determine whether private network 240 is protected by a captive portal. In one embodiment, proxy 335 transmits a signal to private network 240 in order to see how private network 240 responds.

For purposes of clarity, in order to transmit VPN traffic over private network 240 after (or while) traffic (such as VPN traffic) is transmitted via network 230, it is desirable for private network 240 to be permitted to transmit VPN traffic thereon. For example, if VPN traffic simply begins to be transmitted from encapsulation module 330 to private network 240 (with a captive portal in place), private network 240 will simply ignore the encapsulated data being transmitted from encapsulation module 330 because the captive portal has not given permission for data (including encapsulated data) to be sent over private network 240 to Internet 225. Therefore, as private network 240 is coupled to captive portal authentication server 250, proxy 335 transmits to private network 240 data that has not been encapsulated in order to gain access to private network 240. An example of data transmitted to private network 240 is the HTTP request described above. If in response to the HTTP request an expected response is not received, then captive portal detector 325 determines that proxy 335 is in communication with a captive network that is protected by a captive portal. Captive portal detector 325 then instructs proxy 335 to interact with captive portal authentication server 250 until client 210 has been authenticated. Once captive portal detector 325 determines that client 210 has been authenticated, a VPN channel to Internet 225 may now be active via private network 240.

Figure 4:
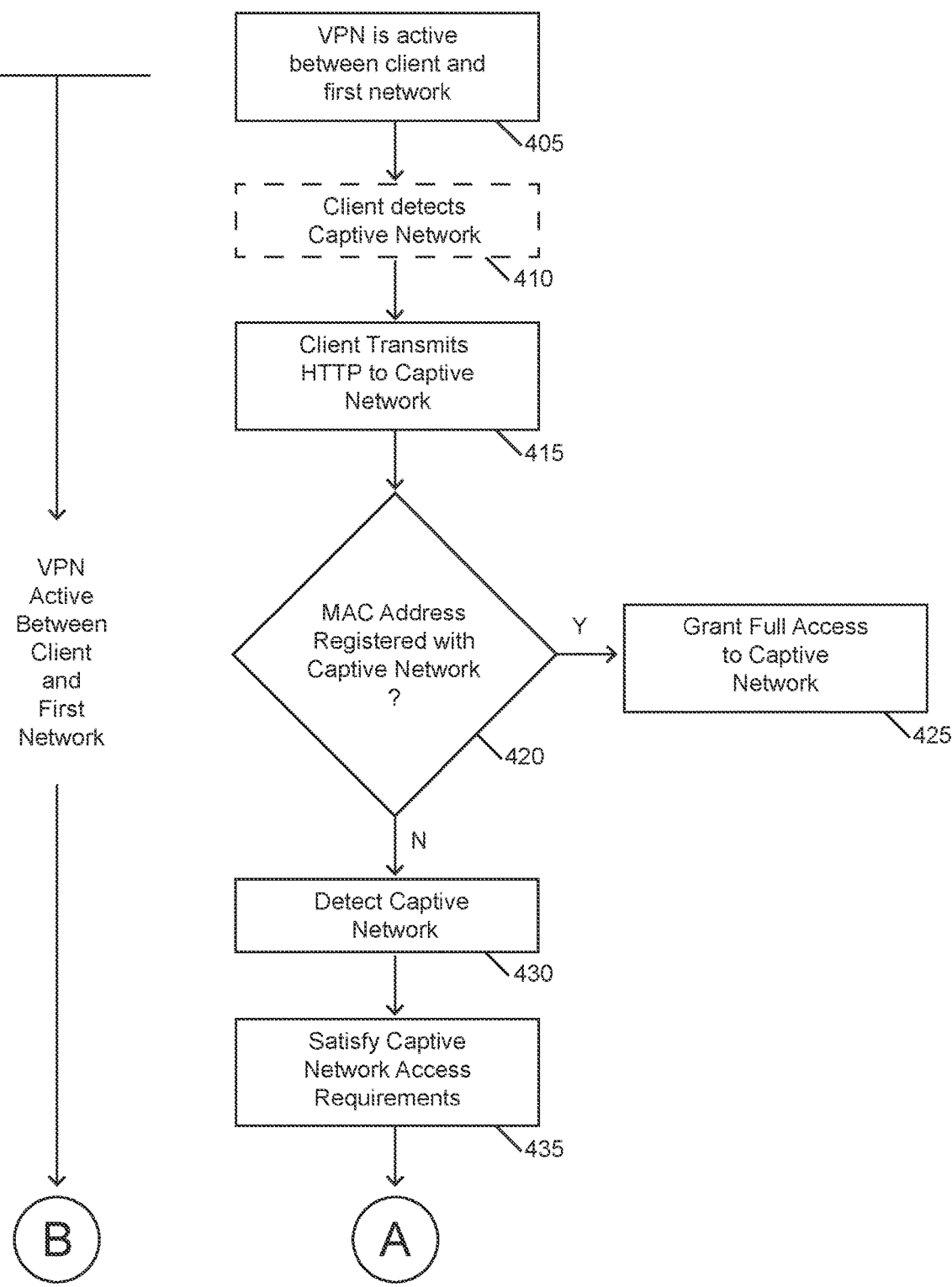
FIG. 4 is a flowchart diagram that illustrates operation of an exemplary embodiment of the present invention.
Figure 5:
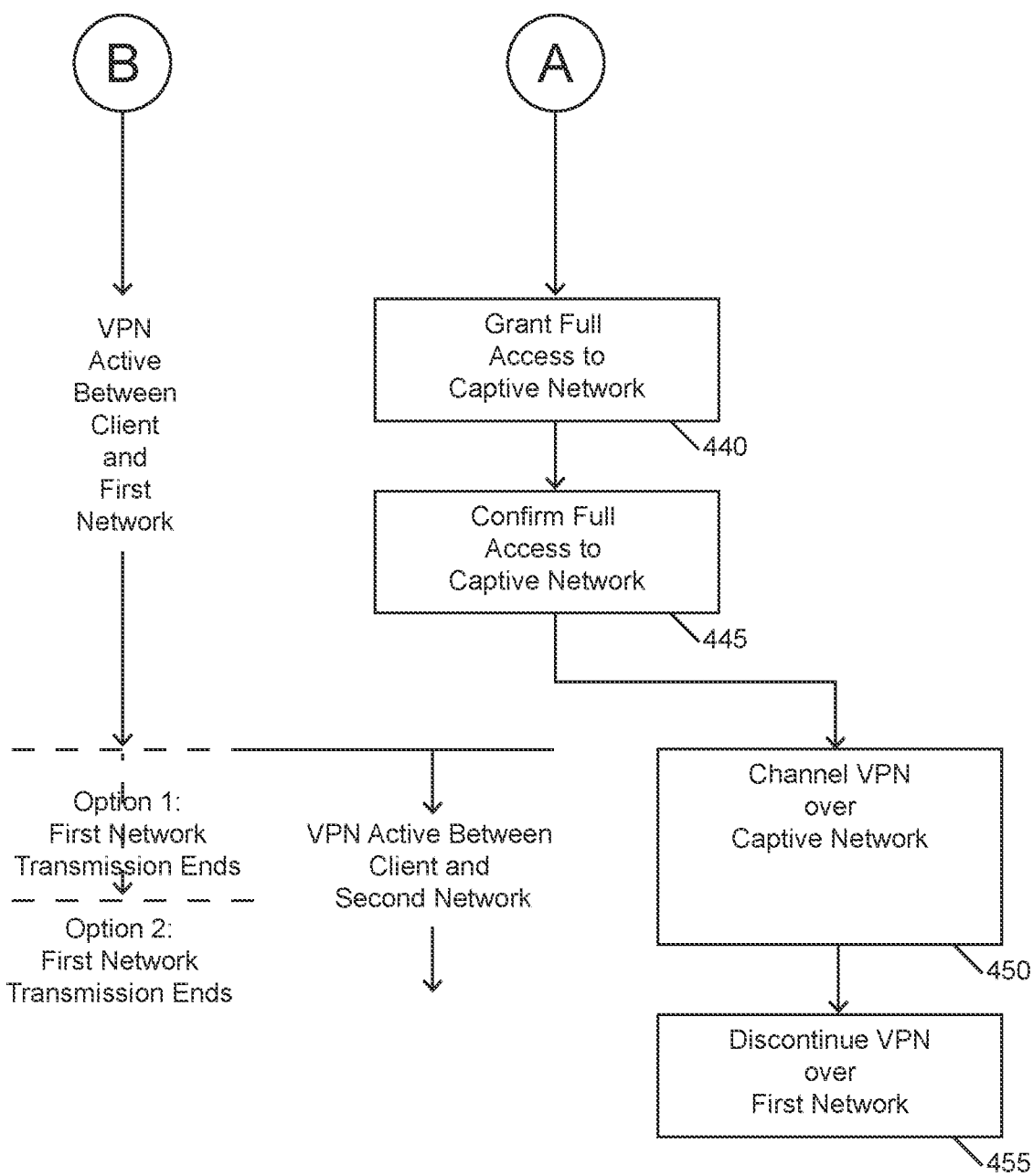
FIG. 5 is a further flowchart diagram that illustrates operation of an exemplary embodiment of the present invention.

FIG. 4 and FIG. 5 are flowchart diagrams that illustrate operation of an exemplary embodiment of the present invention. FIG. 4 and FIG. 5 are each two flowchart diagrams. On the left side of each figure, as an example, an indication is provided of which network is currently carrying an active VPN channel. For example, as shown in FIG. 5, there may be a time period during which a VPN channel is active over both the first exemplary network and the second exemplary network. Alternatively, and not shown, there may not be an overlap time, i.e., the VPN channel may cease to be active on one network and simultaneously begin to be active on another network. In another exemplary embodiment, as shown in FIG. 5, when the VPN channel becomes active on the second network, termination of the VPN channel on the first network may be optional, i.e. the VPN channel (or multiple VPN channels) may exist simultaneously on the first network and the second network. Furthermore, the VPN channel (or multiple VPN channels) may be simultaneously active on both networks for a short period of time (until successful transition from one network to another network can be confirmed) or for a longer period of time.

At step 405, a VPN channel is active between the client and a first network. At optional step 410, the client detects an access point for a second network (which may or may not be a captive network). At step 415, the client transmits a signal to the second network access point to determine whether the second network is a captive network. At step 420, for example, if the second network is indeed a captive network, the captive portal authentication server determines whether the client has already been registered with (and has permission to access) the second network. This may be accomplished, for example, by maintaining a list of the MAC address of any client that is permitted to access the captive network. In the example, at step 420, the second network determines whether the MAC address of the client is on the list. At step 430, if access to the second network is restricted (i.e. the client has not been registered with the second network), it is determined that the second network is indeed a captive network.

In an exemplary embodiment of the present invention, if a captive portal is detected, a user may be alerted (desktop: in app prompt: mobile: notification) and given an option to launch a new browser window (desktop: separate window in app process; mobile: separate browser activity in app) to complete the captive portal login procedure. In another embodiment of the present invention, a program may request the captive portal page, and submit a response to complete the captive portal login procedure with no user interaction being required.

At step 435, the captive network access requirements are satisfied. As explained above, the captive network access requirements may vary and may include, for example, agreeing to terms of use, providing an email address, providing a credit card, etc. Processing then proceeds to step 440 (FIG. 5) by off page connector "A". At step 440, if the requirements of the captive network have been satisfied, then full (or greater) access to the captive network is granted. At step 445, the client receives acknowledgment that full (or greater) access to the captive network has been granted. This acknowledgement may be, for example, allowing the client to retrieve and display a web page over the Internet. This acknowledgment may be, or example, sending the client a message that access to the captive portal has been granted. At step 450, the VPN channel is now active over the second network. Steps 445 and 450 may be interchanged. At step 455, the VPN channel over the first network is optionally discontinued.

In a further embodiment of the present invention, a user closing a browser window may trigger a recheck of captive portal status. Alternatively, a captive portal check could be triggered by the failure of a transport socket. As further alternative, a timer in software could trigger the recheck of captive portal status on a regular basis.

In the above description, the word "access" has been used. It is understood that "access" may refer to the act of transitioning from zero access to an amount of access greater than zero. It is also understood that "access" may refer to the act of transitioning from a first amount of access to a second amount of access greater than the first amount. It is also understood that "access" may refer to the act of transitioning from a) less than full access to a resource to b) full access to that resource.

In the above description, a "client" has been described that is secure. It is understood that a client may include a communications device and/or computer that is able to transmit and/or receive data in a manner so that it is secured, i.e. data that is not available for inspection unless permitted. Encryption, for example, may render a client and/or data transferred therewith secure.

The above explanation has included exemplary embodiments to permit a secure channel (such as a VPN channel) that is active on a first network to continue to be active on a second network. One advantage of the above features is that, while using a VPN, when transitioning from a first network to a second network protected by a VPN, the transition is seamless. Otherwise, if transition from a first network to a captive network is attempted during VPN communication, the VPN communication may simply fail at the time when the transition is attempted. Furthermore, if VPN communication is occurring over one network, and an access point to a second network becomes available, the above features enable the VPN communication to then occur in a multipath environment. Otherwise, if the second network is protected by a captive portal, an attempt to continue the VPN communication in a multipath environment may fail, as the captive portal will prevent the establishment of the VPN channel over the captive network.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions embodying any one or more of the methodologies of functions described herein. Data storage may also reside, completely or at least partially, within main memory and/or within processing device during execution thereof by computer system; main memory and processing device also constituting machine-readable storage media.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general-purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A method comprising:
    forwarding, via a client device, data across a first communication network to a virtual private network (VPN) server, wherein the data is destined for a remote server;
    forwarding a request sent outside the VPN server, via the client device, to access a second communication network detected by the client device;
    receiving, via the client device, a captive portal requiring authentication information;
    forwarding, via the client device, the authentication information to an authentication server to obtain access to the second communication network, wherein the authentication information is not forwarded to the VPN server; and
    forwarding and receiving additional data, via the client device, to the VPN server concurrently across the first communication network and the second communication network.

2. The method of claim 1, comprising
    establishing, via the client device, a first connection across the first communication network;

establishing, via the client device, a second connection across the second communication network; and bonding the first and second connections to form a single data connection using the first and second connections.

3. The method of claim 2, wherein the first communication network is a first Wi-Fi network and the second communication network is a second Wi-Fi network.

4. The method of claim 1, wherein the data and the additional data is encapsulated and encrypted by the client device prior to being forwarded to the VPN server.

5. The method of claim 1, wherein the first communication network is a cellular network.

6. The method of claim 1, wherein the second communication network is a Wi-Fi network.

7. The method of claim 1, wherein the request comprises a HTTP message.

8. The method of claim 1, wherein the request is sent to an authorization server that authorizes access to the second communication network.

9. A client device comprising memory and a processor, wherein the processor is configured to execute instructions stored in the memory causing the processor to perform:

forward data across a first communication network to a virtual private network (VPN) server, wherein the data is destined for a remote server;

forward a request sent outside the VPN server to access a second communication network detected by the client device;

receive a captive portal requiring authentication information;

forward the authentication information to an authentication server to obtain access to the second communication network, wherein the authentication information is not forwarded to the VPN server; and forward and receive additional data to the VPN server concurrently across the first communication network and the second communication network.

10. The client device of claim 9, wherein the processor is further configured to establish a first connection across the first communication network;

establish a second connection across the second communication network; and bond the first and second connections to form a single data connection using the first and second connections.

11. The client device of claim 10, wherein the first communication network is a first Wi-Fi network and the second communication network is a second Wi-Fi network.

12. The client device of claim 9, wherein the data and the additional data is encapsulated and encrypted by the client device prior to being forwarded to the VPN server.

13. The client device of claim 9, wherein the first communication network is a cellular network.

14. The client device of claim 9, wherein the second communication network is a Wi-Fi network.

15. The client device of claim 9, wherein the request comprises a HTTP message.

16. The client device of claim 9, wherein the request is sent to an authorization server that authorizes access to the second communication network.

17. A non-transitory computer readable storage medium configured to store instructions that when executed cause a processor to perform:

forwarding, via a client device, data across a first communication network to a virtual private network (VPN) server, wherein the data is destined for a remote server;

forwarding a request sent outside the VPN server, via the client device, to access a second communication network detected by the client device;

receiving, via the client device, a captive portal requiring authentication information;

forwarding, via the client device, the authentication information to an authentication server to obtain access to the second communication network, wherein the authentication information is not forwarded to the VPN server; and forwarding and receiving additional data, via the client device, to the VPN server concurrently across the first communication network and the second communication network.

18. The non-transitory computer readable storage medium of claim 17, wherein the processor is further configured to perform:

establishing, via the client device, a first connection across the first communication network;

establishing, via the client device, a second connection across the second communication network; and bonding the first and second connections to form a single data connection using the first and second connections.

19. The non-transitory computer readable storage medium of claim 17, wherein the data and the additional data is encapsulated and encrypted by the client device prior to being forwarded to the VPN server.

20. The non-transitory computer readable storage medium of claim 17, wherein the first communication network is a cellular network.

* * * * *